3,461,089
CROSS-LINKED ACRYLIC ACID POLYMER ADMIXED WITH POLYETHYLENE GLYCOL

Normand E. Brindamour, Worcester, Pa., assignor to Merck & Co., Inc., Rahway, N.J., a corporation of New Jersey
No Drawing. Original application Apr. 21, 1964, Ser. No. 361,537, now Patent No. 3,379,554. Divided and this application Nov. 6, 1967, Ser. No. 704,194
Int. Cl. C08f 37/00, 45/34
U.S. Cl. 260—17.4
2 Claims

ABSTRACT OF THE DISCLOSURE

Coatings for tablets and other individual solid medicinal dosage forms are disclosed comprising a water-soluble acrylic acid polymer cross-linked with polyallyl sucrose and admixed with polyethylene glycol.

---

This invention relates to novel compositions of coatings for tablets and other individual solid medicinal dosage forms which are characterized by a thin film outer layer of a water dispersible or water soluble composition. The invention also involves a novel spray method of application of the composition.

This application is a division of my application Ser. No. 361,537, filed Apr. 21, 1964, now Patent 3,379,554.

This invention provides an improved series of coating compositions based on the combined use of known film forming materials. One ingredient is chosen from a group (1) high molecular weight polyethyleneglycols and their esters and the other ingredient is chosen from a group of (2) high molecular weight carboxyvinyl polymers. The resulting coating has the following particular advantages:

(1) The vinyl polymer imparts water solubility to the coating.

(2) The vinyl polymer is used in smaller amounts than if it were used alone.

Although the (1) polyethylene glycols and their esters and the (2) carboxylvinyl polymers have been employed in making tablets and tablet coatings, the first as a film and the second to delay release, their combination in accordance with this invention produces an unexpectedly valuable coating. Neither (1) or (2) can be applied alone to a core to provide a satisfactory coating having the required pharmaceutical requisites. The first when used alone produces too soft a coat, is not smooth, has an orange peel effect, and has a low melting point. The second cannot be poured by itself to give satisfactory coatings nor can it be sprayed without forming cobwebs. Modifying (2) and (1) and applying the combination of this novel process produces a continuous film which is hard, glossy and smooth, will not chip, and can be made to have the required pearlescence.

The carboxyvinyl polymers are described in the data bulletin, "Carbopol 934, B. F. Goodrich Chemical Company" and also in Chem. Eng. News, 36, No. 39, p. 64, Sept. 29, 1958. The preferred polymer is sold as Carbopol 934, but it may be any one of the water soluble vinyl polymers having active carboxy groups as is disclosed in United States Patent No. 2,909,462. The polyethylene glycols useful for the present invention are solids having the formula $HOCH_2(CH_2OCH_2)_nCH_2OH$ in which $n$ is a whole number which will give a molecular weight of from 3,000 to 20,000. Suitable ones are sold under the trademark Carbowax. Their esters are formed with fatty acids.

It has now been found that a continuous, non-toxic, glossy film coating having that required solubility characteristics may be produced on shaped cores containing pharmaceutical ingredients by the deposition thereon of a composition consisting essentially of a solution of 5 to 10 parts by weight of (1) the polyethylene glycol and 1 part by weight of (2) the water soluble carboxyvinyl polymer, minor amounts of gelling, suspending, opacifying, plasticizing, solubilizing, coloring, glossing, tack reducing, and alkalizing agents of the kinds commonly used in pharmaceutical manufacture may or may not be used.

Solvents suitable for the process may be water, methanol, ethanol, isopropanol, propanol, acetone, methyl ethyl ketone, chloroform, methylene chloride, carbon tetrachloride, chloroethene, dimethylacetamide, methyl acetate, ethyl acetate, ethyl lactate, dioxane, benzene, toluene, Freona (the groups of low boiling alcohols), aldehydes and ketones, and mixtures or blends of the above. These ingredients may be used in the following ranges in making up the liquid composition to be applied to the tablet to form a film coating therein:

| | Percent |
|---|---|
| Carboxyvinyl polymer | 0.01 to 3 |
| Polyethylene glycol 4,000 to 20,000 | 0.05 to 30 |
| Gelling, tack reducing, suspending agent | 0 to 5 |
| Opacifying agent | 0 to 10 |
| Tack reducing, glossing agent | 0 to 20 |
| Organic or inorganic alkalizing agent | 0 to 10 |
| Plasticizing agent | 0 to 5 |
| Surfactant | 0 to 0.5 |
| Coloring agent | 0 to 5 |
| Solvent | Q.s. |

In using this composition it is possible to use a conventional pear shaped rotating coating pan and to spray it on the tumbling tablets. However, best results are obtained if one uses the specially designed rotating coating pan and its associated equipment which are described in my patent application Ser. No. 347,804 filed on Apr. 6, 1964. That description is incorporated herein by reference.

The following examples are presented in order to describe the invention more fully, but it should be understood that the invention is not intended in any way to be limited by the examples.

EXAMPLE 1

Coating solution

Two grams of Carbopol 934 and 20 grams of Carbowax 6000 were dissolved in enough methanol to make 100 ml.

Coating procedure

Five hundred grams of 10/32" standard curvature placebo tablets each weighing 270 mg. were placed in the coating pan equipped with a blower to direct dry air on the tumbling tablets and with an exhaust system to suck air from the interior of the pan. A paint container and spray nozzle operated at 30 pounds air pressure and having a 10" fluid head pressure was placed to continuously coat the tumbling tablets. The coating pan was rotated at 30 r.p.m. The solution was sprayed in such a direction that the plane of the tablet flow surface formed a right angle with the line of spray, the spray distance to the tablets being 3". The drying air input and exhaust were adjusted to prevent the tablet load from becoming wet as the film was deposited on the individual tablets. The temperature of the tablet bed was kept within 20° and 30° C. The solution was sprayed at the rate of 5 ml. per minute until 100 ml. had been consumed. The tablets were allowed to roll for 15 minutes after the final application of the solution. The resulting tablets were glossy, smooth, and homogeneously coated. The disintegration time of both the coated and uncoated tablet was the same. A gas chromatogram of the coated tablet showed no residual solvent. The coating is not softened when exposed to either 50° C. or to a 75% relative humidity atmosphere for a period of two weeks.

EXAMPLE 2

The coating of Example 1 was carried out except that 5% iron oxide was suspended in the film coating solution, and Carbowax 4000 was substituted for the Carbowax 6000.

EXAMPLE 3

A 500 gram batch of ¼" standard curvature amitriptyline (sold under the trademark Elavil) tablets was coated with a solution containing 0.5% Carbopol 934 and 5% Carbowax 6000 so that the initial 270 mg. tablet was coated with 2.88 mg. of solids. The 30–40 minutes disintegration time was unchanged after the addition of the film.

EXAMPLE 4

The coating of Example 3 was carried out except that 5% iron oxide was suspended in the film coating solution, and polyethylene glycol having an average molecular weight of 20,000 was substituted for the Carbowax 6000.

EXAMPLE 5

A 500 gram batch of capsule-shaped tablets containing dexamethasone and aspirin (sold under the trademark Decagesi c) was coated with a solution containing 0.5% Carbopol 934 and 2.5% Carbowax 6000 in methanol so that the initial 700 mg. tablet was coated with 6 mg. of solids. The uncoated disintegration time of 4 to 5 minutes was unaffected by the coating.

EXAMPLE 6

The coating of Example 5 was carried out except that the spray was stopped after each 10 ml. of solution and the damp tablets were dusted with yellow talc in such a manner that each tablet was coated with 30 mg. of yellow talc for a total 36 mg. of solids. The uncoated disintegration time of 4 to 5 minutes was unaffected by the coating. The talc imparts a pearly sheen to the tablets.

EXAMPLE 7

A 500 gram batch of ¼" standard curvature amitriptyline tablets (solid under the trademark Elavil) was coated with a solution containing 0.5% Carbopol 934 and 2.5% Carbowax 6000 in methanol so that the initial 120 mg. tablet was coated with 1.44 mg. of solids. The 30 to 40 minute disintegration time of the uncoated tablet was unaffected by the coating.

EXAMPLE 8

The coating of Example 7 was carried out except that the spray was stopped after each 5 ml. of solution and the damp tablets were dusted with yellow talc in such a manner that each tablet was coated with 5 mg. of yellow talc for a total 6.44 mg. of solids. The 30 to 40 minute disintegration time of the uncoated tablet was unaffected by the coating. The talc imparted a pearly sheen to the tablets.

EXAMPLE 9

A 500 gram batch of 5/16" standard curvature indomethacin tablets (sold under the trademark Indocin) engraved with a symbol was coated with a solution containing 0.5% Carbopol 934 and 2.5% Carbowax 6000 in methanol so that the initial 200 mg. tablet was coated with 2.4 mg. of solids. The 3 to 5 minute disintegration time of the uncoated tablet was unchanged by the coating. The symbol was clear.

EXAMPLE 10

The coating of Example 9 was carried out except that the spray was stopped after each 10 ml. of solution and the damp tablets were dusted with a blend of talc, iron oxide, and titanium dioxide in such a manner that each tablet was coated with 8.8 mg. of talc, 1 mg. of iron oxide, and 0.2 mg. of titanium dioxide for a total 12.4 mg. of solids. The 3 to 5 minute disintegration time of the uncoated tablet was unaffected by the coating. The symbol was coated and clear. The tablets acquired a pearly sheen.

EXAMPLE 11

A 500 gram batch of ¼" standard curvature Elavil tablets was coated with a solution of 2% Carbopol 934 and 20% Carbowax 6000 in water so that the initial 120 mg. tablet was coated with 10.08 mg. of solids. The spray was stopped after each 5 ml. of solution and the damp tablets were dusted with yellow talc. The 30 to 40 minute disintegration time of the uncoated tablet was unaffected by the coating.

EXAMPLE 12

The polyethylene glycol used in any one of the above examples may be replaced with the known corresponding fatty acid ester. For instance, the Carbowax 6000 used in Example 11 may be replaced with polyethylene glycol 6000 monostearate.

In the appended claims, reference to polyethylene glycol is intended to include both the free alcohol and the fatty acid esters.

What is claimed is:

1. The film coating comprised of (A) one part by weight of a water-soluble polymer of acrylic acid crosslinked with approximately 1% of polyallyl sucrose and having an approximate molecular weight of 200,000 and (B) from 5 to 10 parts by weight of a polyethylene glycol having an average molecular weight of from about 3,000 to 20,000.

2. A liquid composition for applying a film coating to a medicinal core, which has the following ingredients:

| | Percent |
|---|---|
| Water-soluble polymer of acrylic acid crosslinked with approximately 1% of polyallyl sucrose, M.W. approx. 200,000 | 0.01 to 3 |
| Polyethylene glycol 4,000 to 20,000 | 0.05 to 30 |
| Gelling, tack reducing, suspending agent | 0 to 5 |
| Opacifying agent | 0 to 10 |
| Tack reducing, glossing agent | 0 to 20 |
| Organic or inorganic alkalizing agent | 0 to 10 |
| Plasticizing agent | 0 to 5 |
| Surfactant | 0 to 0.5 |
| Coloring agent | 0 to 5 |
| Solvent | Q.s. |

References Cited

UNITED STATES PATENTS

| 3,149,041 | 9/1964 | Jeffries | 260—33.2 X |
| 3,206,420 | 9/1965 | Smart et al. | 260—33.2 X |
| 3,361,702 | 1/1968 | Wartman et al. | 260—33.2 |

MORRIS LIEBMAN, Primary Examiner

L. T. JACOBS, Assistant Examiner

U.S. Cl. X.R.

260—28, 33